(12) United States Patent
Puzicha et al.

(10) Patent No.: US 7,933,859 B1
(45) Date of Patent: Apr. 26, 2011

(54) SYSTEMS AND METHODS FOR PREDICTIVE CODING

(75) Inventors: Jan Puzicha, Bonn (DE); Steve Vranas, Reston, VA (US)

(73) Assignee: Recommind, Inc., San Francisco, CA (US)

( * ) Notice: Subject to any disclaimer, the term of this patent is extended or adjusted under 35 U.S.C. 154(b) by 0 days.

(21) Appl. No.: 12/787,354

(22) Filed: May 25, 2010

(51) Int. Cl.
*G06F 15/18* (2006.01)

(52) U.S. Cl. ............... 706/62; 706/15; 706/20; 706/21; 706/45; 706/46; 706/52; 715/700; 715/701

(58) Field of Classification Search .................. None
See application file for complete search history.

(56) References Cited

U.S. PATENT DOCUMENTS

| | | | | |
|---|---|---|---|---|
| 4,839,853 | A * | 6/1989 | Deerwester et al. | 1/1 |
| 6,687,696 | B2 * | 2/2004 | Hofmann et al. | 1/1 |
| 7,328,216 | B2 * | 2/2008 | Hofmann et al. | 1/1 |
| 7,376,635 | B1 | 5/2008 | Porcari et al. | |
| 7,558,778 | B2 | 7/2009 | Carus et al. | |
| 7,657,522 | B1 * | 2/2010 | Puzicha et al. | 707/723 |
| 2003/0120653 | A1 | 6/2003 | Brady et al. | |
| 2005/0027664 | A1 * | 2/2005 | Johnson et al. | 706/12 |
| 2006/0242190 | A1 * | 10/2006 | Wnek | 707/102 |
| 2006/0294101 | A1 * | 12/2006 | Wnek | 707/7 |
| 2008/0086433 | A1 | 4/2008 | Schmidtler et al. | |
| 2009/0083200 | A1 | 3/2009 | Pollara et al. | |
| 2009/0119343 | A1 * | 5/2009 | Jiao et al. | 707/200 |
| 2009/0164416 | A1 * | 6/2009 | Guha | 707/2 |
| 2010/0250474 | A1 | 9/2010 | Richards et al. | |

OTHER PUBLICATIONS

Thorsten, "Transductive Inference for Text Classification Using Support Vector Machines", Proceedings of the Sixteenth International Conference on Machine Learning, 1999, 10 pages.*

* cited by examiner

*Primary Examiner* — Omar F Fernandez Rivas
(74) *Attorney, Agent, or Firm* — Carr & Ferrell LLP

(57) ABSTRACT

Systems and methods for analyzing documents are provided herein. A plurality of documents and user input are received via a computing device. The user input includes hard coding of a subset of the plurality of documents, based on an identified subject or category. Instructions stored in memory are executed by a processor to generate an initial control set, analyze the initial control set to determine at least one seed set parameter, automatically code a first portion of the plurality of documents based on the initial control set and the seed set parameter associated with the identified subject or category, analyze the first portion of the plurality of documents by applying an adaptive identification cycle, and retrieve a second portion of the plurality of documents based on a result of the application of the adaptive identification cycle test on the first portion of the plurality of documents.

6 Claims, 10 Drawing Sheets

US 7,933,859 B1

SYSTEMS AND METHODS FOR PREDICTIVE CODING

FIELD OF THE INVENTION

This invention relates generally to systems and methods for analyzing documents, and more particularly, to systems and methods for analyzing documents using predictive coding.

BACKGROUND OF THE INVENTION

Documents may be reviewed and analyzed manually by humans, which oftentimes requires the use of valuable resources, such as time, money and manpower. Relying merely on "human-only review" of documents may not be the best choice available for document review and analysis, particularly when the documents involved are voluminous.

SUMMARY OF THE INVENTION

Systems, methods and media for analyzing documents are provided herein. One object of the present technology is to provide a higher quality and accuracy of document review. Such a higher quality of review of documents may be measurable. Another object of the present technology is to reduce the time required to review documents, particularly in the case of a voluminous amount of documents. According to various embodiments, the present technology limits the manual "human-only review" to a subset of documents, and this subset of manually reviewed documents are reviewed more quickly. In other words, the "human-only review" documents are reduced to a small number of documents, while the majority of the documents are analyzed through automated predictive coding of documents through computer processing and machine learning. A further object of the present technology is to reduce the costs associated with document review, as the present technology requires fewer human reviewers to participate in the document review. Yet a further object is to identify and prioritize documents in early stages of document review, such that early issue resolution may be within reach.

These and other objects of the present technology are achieved in an exemplary method of analyzing documents. A plurality of documents is received via a computing device. User input is received from the computing device. The user input includes hard coding of a subset of the plurality of documents. The hard coding is based on an identified subject or category. Instructions stored in memory are executed by a processor to generate a coded seed set (called the "initial control set") based on the subset of the plurality of documents and the received user input on the subset, analyze the initial control set to determine at least one seed set parameter associated with the identified subject or category. Further instructions stored in memory are executed by the processor to automatically code a first portion of the plurality of documents based on the initial control set and the at least one seed set parameter associated with the identified subject or category.

Also, instructions stored in memory are executed by the processor to analyze the first portion of the plurality of documents by applying a an adaptive identification cycle, the adaptive identification cycle being based on the initial control set and user validation of the automated coding of the first portion of the plurality of documents. Finally, instructions stored in memory are executed by the processor to retrieve a second portion of the plurality of documents based on a result of the application of the adaptive identification cycle on the first portion of the plurality of documents to conduct confidence threshold validation.

In some embodiments, the objects of the present technology may be implemented by executing a program by a processor, wherein the program may be embodied on a computer readable storage medium.

DETAILED DESCRIPTION OF THE INVENTION

Figure 1:
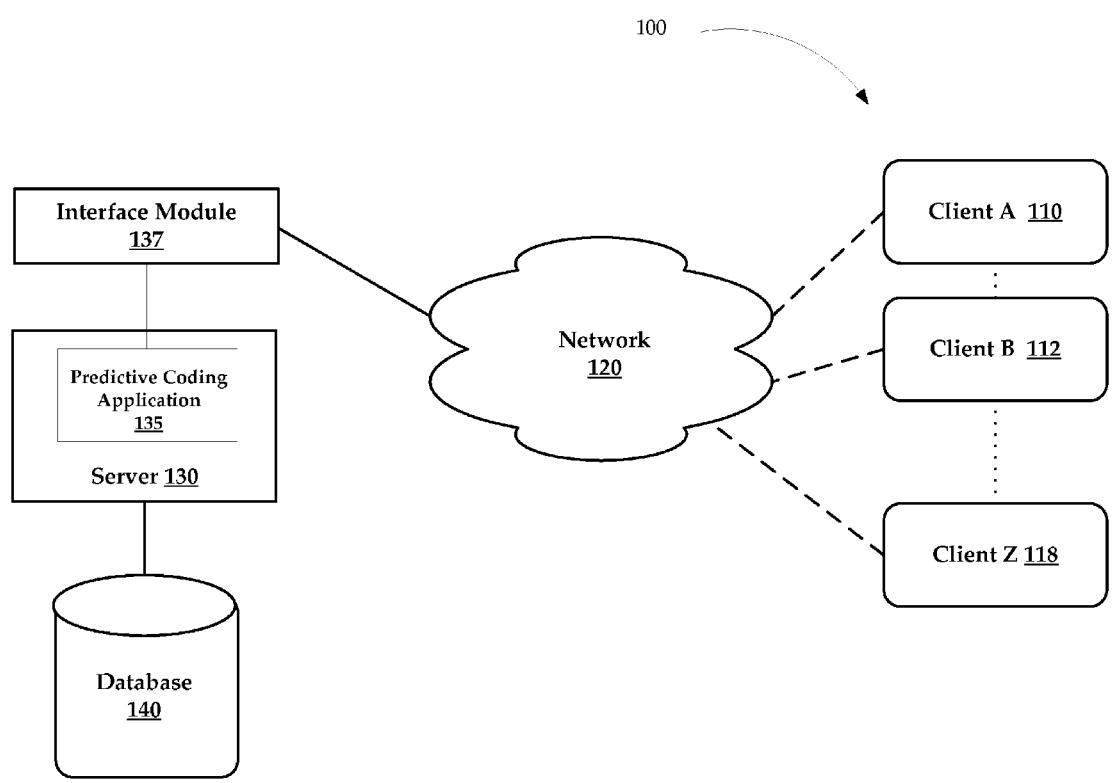
FIG. 1 is a block diagram of an exemplary networking environment in accordance with various embodiments of the present invention.

Embodiments of the present technology provide systems, methods, and media for analyzing documents. Specifically, this technology may utilize predictive coding (also known as "predictive tagging") as a way to review and analyze documents. Predictive coding refers to the capability to use a small set of coded documents (or partially coded documents) to predict document coding of a corpus. In some embodiments, a corpus includes a plurality of documents, a data collection, a document collection, or any grouping of documents that require review and analysis. The corpus may comprise a plurality of documents that include electronically stored information (ESI).

Predictive coding is particularly helpful in the context of e-discovery document review when the number of documents is voluminous. Predictive coding allows for one to respond to a document request (such as a request for documents in the context of litigation or in response to a subpoena), in an efficient, cost-effective manner that may be legally defensible before a given court or agency. In other words, the technology allows for a producing party to be able to produce documents in a defensible manner that meets the "reasonableness" standard of document review. According to various embodiments, the technology allows for a user to provide a set of training documents for a given identified category, subject or tag, and then the user may request the computer application or software to locate other documents in the plurality of documents that should be similarly coded, categorized or tagged. That is, this technology allows for the automated coding of documents based on a seed set.

Predictive coding solves many problems that previously plagued document reviewers. For instance, document review and analysis only by humans (also known as "human-only linear review") may include such difficulties as human error and inconsistent analysis of documents when more than one person is involved in document review. Also, when documents are reviewed manually, issues may be added, identified, or may be resolved later in the process, such that reviewers who added, resolved or defined issues at a later period may analyze documents in a different manner than the original reviewers, thereby giving rise to an inconsistent analysis and coding of the documents. An added problem with "human-only linear review" is that it is unlikely that the documents will be re-reviewed, due to the amount of time and effort it would take to do so for a voluminous document collection.

One way that the present technology overcomes these problems is its application of machine learning technology based on probabilistic latent semantic analysis (PLSA) to a data collection or a plurality of documents to conduct automated review and coding. An "initial control set" of data may be a subset of documents that have been manually coded based on certain criteria (such as relevancy, issue, or privilege). Then, a coded control set of data that is based on the training data set may be used to automatically apply the same coding determinations to contextually similar data in a larger data set.

Through automated review and coding, the present technology reduces the time and the costs associated with document review. The technology may limit a manual "human-only" review of documents to a subset of documents, and thus the time consumed by a document review is reduced dramatically. The manual "human-only" review may mean that a reviewer physically reviews a document to hard code the document. Hard coding may include coding or tagging a document based on categories or classifications. According to various embodiments of this technology, hard coding refers to a process of human reviewers reading and evaluating a document to code it based on one or more categories.

Also, since the technology requires fewer reviewers to review documents and the technology includes automated coding of documents, the actual costs associated with the document review are also dramatically reduced. Furthermore, the technology provides a higher quality of review, which may be quantified by statistical analysis. The quality of a review may be measured by comparing the accuracy and recall of "machine-reviewed" documents versus "human-only" reviewed documents. Also, the technology allows for an efficient machine review of every document of the corpus because the technology "learns" how documents should be properly coded and can therefore review each document to ensure that proper coding has been implemented.

Another advantage of the present technology is that predictive coding may speed up the review process of documents by a factor of 2x-5x. Predictive coding may allow for a computer system to provide a pre-populated coding form to a reviewer, such that in most cases, the reviewer's time may be reduced to only confirmation or verification of the predictive coding. Also, the technology may permit the system to provide highlighting hints within a document to guide a reviewer to his or her decisions, thereby focusing the reviewer to the most important portions of the document to review.

Through predictive coding, the technology may lead to a more consistent review across a plurality of reviewers. Furthermore, the present technology may dramatically reduce the number of false positives while eliminating or limiting false negatives. That is, the predictive coding feature may provide a computer-generated judgment on coding of documents, with an explicit confidence score, about certain aspects of the documents (such as relevancy, responsiveness and privileged nature of the documents). Predictive coding may also integrate random sampling and reporting, such that users may test for quality control and quality assurance.

A further advantage of predictive coding is that it allows for non-linear review, such that important documents may be identified, prioritized and reviewed earlier in the process. As discussed previously, the technology allows for a small subset of the plurality of documents to be manually reviewed. In some embodiments, the subset is reviewed manually for relevance and responsiveness of the documents to a pending document request or to an identified subject or category. Once the initial control set is manually reviewed, then the adaptive identification cycle may occur.

As part of the innovative technology, the adaptive identification cycle may include a number of steps. According to various embodiments, the adaptive identification cycle may include the steps of: confidence threshold validation; utilizing all relevant and responsive documents found thus far as a seed set for category training or identified subject training; utilizing all non-relevant documents reviewed thus far as a set of negative examples; enriching the set of negative examples to a given total of documents by randomly sampling the set of non-reviewed documents; train the category or identified subject as being "relevant and responsive"; and batch out and review all non-reviewed documents returned as belonging to the category or identified subject. The technology may allow for multiple training iterations such that seed set may grow over time.

FIG. 1 is a block diagram of an exemplary networking environment 100 in accordance with embodiments of the present invention. The networking environment 100 includes clients A 110, B 112, and so forth through client Z 118 (additional or fewer clients may be implemented), a network 120, a server 130 with a predictive coding application 135 and an interface module 137, and a database 140. As with all of the figures provided herein, one skilled in the art will recognize that any number of elements 110-140 can be present in the networking environment 100 and that the exemplary methods described herein can be executed by one or more of elements 110-140. Any number of any of elements 110-140 can be present in the networking environment 100, and the networking environment 100 is configured to serve these elements. For example, the server 130 may transmit a report via the network 120 to clients 110-118, despite the fact that only three clients are shown in FIG. 1. For all figures mentioned herein, like numbered elements refer to like elements throughout.

Clients 110-118 may be implemented as computers having a processor that runs software stored in memory, wherein the software may include network browser applications (not shown) configured to render content pages, such as web pages, from the server 130. Clients 110-118 can be any computing device, including, but not limited to desktop computers, laptop computers, mobile devices, smartphones, and portable digital assistants (PDAs). The clients 110-118 may communicate with a web service provided by the server 130 over the network 120. Additionally, the clients 110-118 may be configured to store an executable application that encompasses one or more functionalities provided by the predictive coding application 135.

The network 120 can be any type of network, including but not limited to the Internet, LAN, WAN, a telephone network, and any other communication network that allows access to data, as well as any combination of these. The network 120 may be coupled to any of the clients 110-118, the interface module 137, and/or the server 130. As with all the figures provided herewith, the networking environment 100 is exemplary and not limited to what is shown in FIG. 1.

The server 130 can communicate with the network 120 and the database 140. It will be apparent to one skilled in the art that the embodiments of this invention are not limited to any particular type of server and/or database. For example, the server 130 may include one or more application servers, one or more web servers, or a combination of such servers. In some embodiments, the servers mentioned herein are configured to control and route information via the network 120 or any other networks (additional networks not shown in FIG. 1). The servers herein may access, retrieve, store and otherwise process data stored on any of the databases mentioned herein.

Interface Module 137 may be implemented as a machine separate from server 130 or as hardware, software, or combination of hardware and software implemented on server 130. In some embodiments, Interface Module 137 may relay communications between the predictive coding application 135 and Network 120.

The database 140 may be configured to store one or more documents, as well as one or more tables of data, which may be accessible to the predictive coding application 135. In a non-exhaustive list, the documents may include a plurality of documents that are to be reviewed or otherwise analyzed, documents that make up the initial control set, and example documents. The one or more tables of data may include tables that track user permissions, such that the system may only be accessed by those users who have been granted permission. Information regarding documents may also be stored in the database 140. Such information may be regarding any aspect of a document, including but not limited to one or more seed set parameters (which will be discussed in greater detail later herein), metadata associated with a document, the author(s) of a document, the source(s) of a document, information of where the document is currently being physically stored in an enterprise business (such as an office location, a disk drive location, or a name of custodian of the document), the coding, classification, tagging or any other type of analysis of a document (whether it was done through human-only review or by automated coding performed by computer processing), and statistics related to the document. Exemplary statistics related to one or more documents are discussed later herein in greater detail.

The clients 110-118 may interface with the predictive coding application 135 on server 130 via the network 120 and the interface module 137. The predictive coding application 135 may receive requests and/or data from the clients 110-118. The clients 110-118, may provide data for storage in the database 140, and therefore may be in communication with the database 140. Likewise, the predictive coding application 135 may access the database 140 based on one or more requests received from the clients 110-118. Further details as to the data communicated in the networking environment 100 are described more fully herein.

Figure 2:
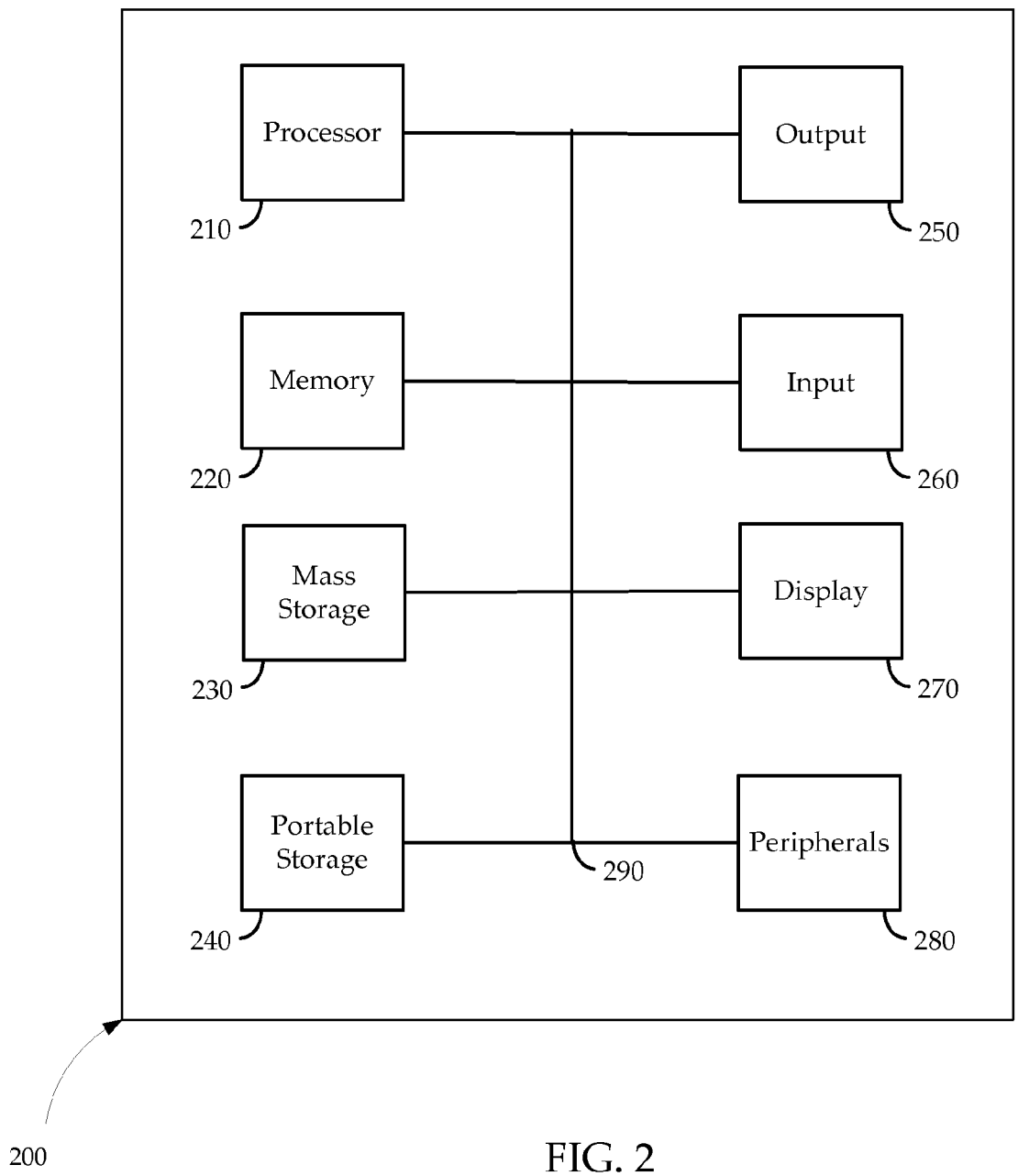
FIG. 2 is a block diagram of an exemplary computing device for analyzing documents in accordance with various embodiments of the present invention.

FIG. 2 is a block diagram of an exemplary computing device for analyzing documents in accordance with embodiments of the present invention. In some embodiments, the exemplary computing device of FIG. 2 can be used to implement portions of the clients 110-118 and the server 130 as shown in FIG. 1.

The computing system 200 of FIG. 2 includes one or more processors 210 and memory 220. The main memory 220 stores, in part, instructions and data for execution by the processor 210. The main memory 220 can store the executable code when in operation. The system 200 of FIG. 2 further includes a mass storage device 230, portable storage medium drive(s) 240, output devices 250, user input devices 260, a graphics display 270, and peripheral devices 280.

The components illustrated in FIG. 2 are depicted as being connected via a single bus 290. However, the components can be connected through one or more data transport means. For example, the processor unit 210 and the main memory 220 can be connected via a local microprocessor bus, and the mass storage device 230, peripheral device(s) 280, the portable storage device 240, and the display system 270 can be connected via one or more input/output (I/O) buses.

The mass storage device 230, which can be implemented with a magnetic disk drive or an optical disk drive, is a non-volatile storage device for storing data and instructions for use by the processor unit 210. The mass storage device 230 can store the system software for implementing embodiments of the present invention for purposes of loading that software into the main memory 220.

The portable storage device 240 operates in conjunction with a portable non-volatile storage medium, such as a floppy disk, compact disk or digital video disc, to input and output data and code to and from the computer system 200 of FIG. 2. The system software for implementing embodiments of the present invention can be stored on such a portable medium and input to the computer system 200 via the portable storage device 240.

Input devices 260 provide a portion of a user interface. Input devices 260 may include an alpha-numeric keypad, such as a keyboard, for inputting alpha-numeric and other information, or a pointing device, such as a mouse, a trackball, stylus, or cursor direction keys. Additionally, the system 200 as shown in FIG. 2 includes output devices 250. Examples of suitable output devices include speakers, printers, network interfaces, and monitors.

The display system 270 may include a CRT, a liquid crystal display (LCD) or other suitable display device. Display system 270 receives textual and graphical information, and processes the information for output to the display device.

Peripherals 280 may include any type of computer support device to add additional functionality to the computer system. For example, peripheral device(s) 280 may include a modem or a router.

The components contained in the computer system 200 of FIG. 2 are those typically found in computer systems that can be suitable for use with embodiments of the present invention and are intended to represent a broad category of such computer components that are well known in the art. Thus, the computer system 200 of FIG. 2 can be a personal computer, hand held computing device, telephone, mobile computing device, workstation, server, minicomputer, mainframe computer, or any other computing device. The computer can also include various bus configurations, networked platforms, multi-processor platforms, etc. Various operating systems can be implemented, including Unix, Linux, Windows, Macintosh OS, Palm OS, and other suitable operating systems.

According to various embodiments, the computer system 200 may be preloaded with one or more documents. That is, for some exemplary embodiments of the present technology, the computer system 200 is preloaded with one or more documents prior to the computer system 200 conducting one or more methods described herein. Those preloaded documents may be documents that have been manually reviewed by humans only. Alternatively, such preloaded documents may be documents that have been automatically coded by one or more computers. The preloaded documents may in fact be example documents which may be used by the computer system 200 for programming on automated coding of documents.

Figure 3:
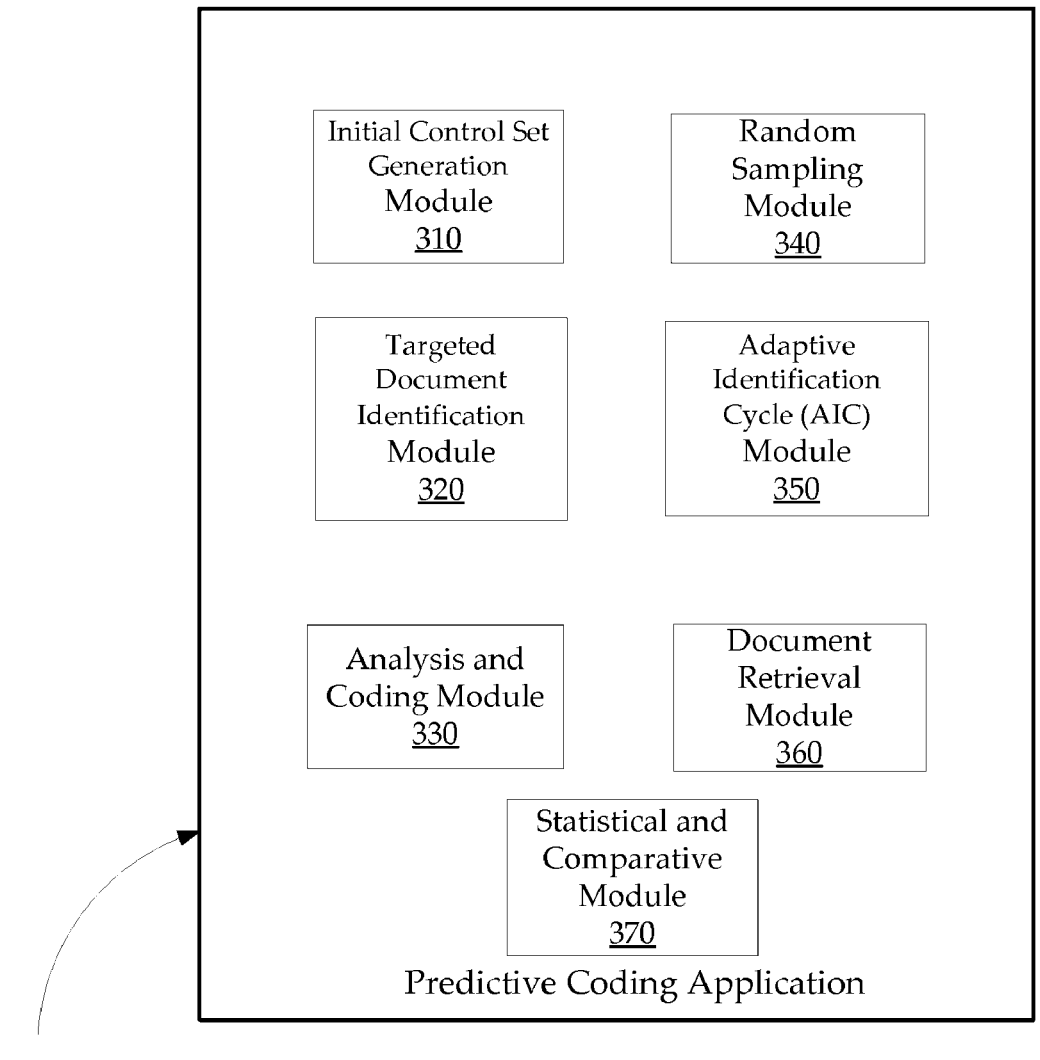
FIG. 3 is a block diagram of an exemplary architecture of a system for analyzing documents in accordance with various embodiments of the present invention.

FIG. 3 is a block diagram of an exemplary architecture of a system in the form of a predictive coding application 135 for analyzing documents. Specifically, FIG. 3 as shown depicts further details of the predictive coding application 135, which is also shown as part of the networking environment 100 of FIG. 1. The predictive coding application 135 may include one or more modules for performing one or more methods as described herein. According to various embodiments of the present technology, the predictive coding application 135 includes an initial control set generation module 310, a targeted document identification module 320, an analysis and coding module 330, a random sampling module 340, an adaptive identification cycle (AIC) module 350, a document retrieval module 360, and a statistical and comparative module 370. Each of the modules 310-370 may communicate with one another. Although various modules may be configured to perform some or all of the various steps described herein, fewer or more modules may be provided and still fall within the scope of various embodiments.

The initial control set generation module 310 of the predictive coding application 135 is responsible for generating one or more initial control sets as part of one or more exemplary methods of document analysis described herein. According to various embodiments, the one or more initial control sets may be based on the subset of the plurality of documents and received user input (in the form of hard coding) on the subset. The initial control set generation module 310 may generate one or more initial control sets or coded sets of data by determining and weighing a number of factors, including but not limited to the correct size of the initial control set or coded set of data, sufficient precision, and sufficient breadth for the one or more initial control sets or coded sets of data.

In exemplary embodiments, the initial control set may be generated based on a small set of documents which have been hard coded by "human-only review" only. In other words, in various exemplary embodiments, humans may only be required to review a small set of documents (such as 10%-35% of the total amount of documents to be reviewed), in order for a initial control set to support a recall and accuracy rate that exceeds the "human only review" of potentially all the documents at issue. According to various embodiments, the initial control generation module 310 may maintain the initial control set and may update the initial control set with further coded documents.

The targeted document identification module 320 is configured for analyzing documents and may not be restricted to merely one type of analysis. The targeted document identification module 320 may apply to any number of documents. In some exemplary instances, the targeted document identification module 320 may analyze the initial control set to determine at least one set parameter associated with the identified subject or category. This type of document analysis will be discussed in greater detail later herein. One skilled in the art will appreciate that the targeted document identification module 320 may not be confined merely to the initial control set. The targeted document identification module may review, analyze or otherwise make determinations based on any number of documents, which may or may not be a part of the initial control set.

The analysis and coding module 330 is responsible for automatically coding documents. According to some exemplary embodiments, the analysis and coding module 330 may automatically code a first portion of the plurality of documents, based on the initial control set and at least one seed set parameter associated with the identified subject or category. In further exemplary embodiments, the analysis and coding module 330 may be coupled to both the interface module 137 and the random sampling module 340, such that the analysis and coding module 330 may automatically code documents based on the received user input (received via the interface module 137) regarding the randomly sampled initial control set documents, which were originally processed by the random sampling module 340.

According to various embodiments, the analysis and coding module 330 may automatically code a second portion of the plurality of documents resulting from an application of user analysis and the adaptive identification cycle and confidence threshold validation conducted by the adaptive identification cycle module 350. According to further exemplary embodiments, the analysis and coding module 330 may automatically code based on probabilistic latent semantic analysis and support vector machine analysis of a portion (such as the first portion) of the plurality of documents.

The random sampling module 340 is responsible for randomly sampling documents. According to various embodiments, the random sampling module 340 randomly samples initial control sets of documents both on a static basis and a rolling load basis. Further discussion on random sampling is provided later herein.

In exemplary embodiments, the adaptive identification cycle module 350 may analyze a first portion of the plurality of documents by applying an adaptive identification cycle test and confidence threshold validation. The adaptive identification cycle will be discussed later herein, but for purposes of the adaptive identification cycle module 350, for some exemplary embodiments, the adaptive identification cycle as applied by the adaptive identification cycle module 350 may be based on both the initial control set and user validation of the automated coding of the first portion of the plurality of documents.

The document retrieval module 360 is responsible for retrieving documents at any given time. According to some embodiments, the document retrieval module 360 retrieves a second portion of the plurality of documents based on a result of the application of the adaptive identification cycle and confidence threshold validation on the first portion of the plurality of documents. The document retrieval module 360 may add documents for document review and analysis. For instance, the document retrieval module 360 may add further documents to the plurality of documents on a rolling load basis. The document retrieval module 360 may add a coded second portion of the plurality of documents to the coded seed set.

The statistical and comparative module 370 is responsible for handling statistical and comparative analysis of documents. In various embodiments, the statistical and comparative module 370 calculates a statistic regarding machine-only accuracy rate of the documents. In further embodiments, the statistical and comparative module 370 compares a statistic regarding machine coding accuracy rate against user input based on a defined confidence interval. The statistic regarding machine coding accuracy rate may be calculated by the statistical and comparative module 370 or by any other component associated with the computer system 200.

The statistical and comparative module 360 may calculate any number of statistics related to any aspect of the documents, including but not limited to statistics on document review and analysis of the documents, statistics related to precision and recall, statistics related to the application of random sampling of the documents, statistics related to the application of the adaptive identification cycle, comparative analysis of human-only review, and any other type of statistic related to predictive coding.

Figure 4:
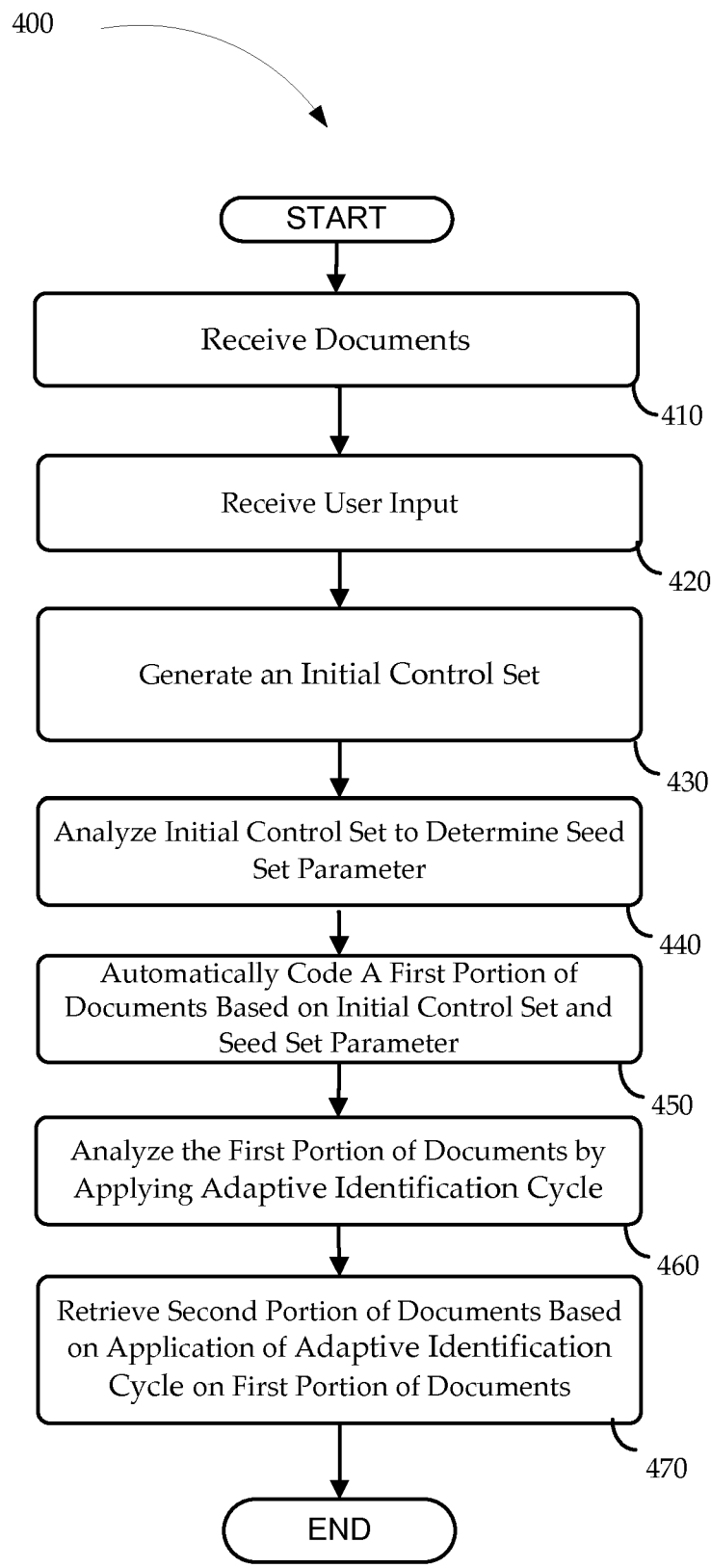
FIG. 4 is a flow diagram of an exemplary method for analyzing documents in accordance with various embodiments of the present invention.

FIG. 4 is a flow diagram of an exemplary method 400 for analyzing documents. The exemplary method 400 may include predictive coding or tagging. At step 410, a plurality of documents is received via one or more computing devices. According to various embodiments, the plurality of documents is received via one or more network-enabled computing device (such as clients 110-118 in FIG. 1). The plurality of documents may be received in one batch (on a static basis) or the new documents may be added to the plurality of documents through multiple rolling loads (on a rolling load basis). In some exemplary embodiments, the step 410 is not necessary because the system is preloaded with the plurality of documents to be analyzed or the system has otherwise gained access to the plurality of documents without having to receive the plurality of documents via one or more computing devices.

At step 420, user input is received from one or more computing devices. In some embodiments, the user input at step 420 may be received from one or more computing devices that are different from the computing devices through which the plurality of documents are received at step 410. In further embodiments, the one or more computing devices involved in steps 410 and 420 are the same. The user input may be received via an input device coupled to the one or more computing devices. The user input may include hard coding of a subset of the plurality of documents. The hard coding may be based on an identified subject or category. The hard coding may include a "human-only review" of the subset of the plurality of documents. The term "hard coding" may refer to any manual coding, tagging, notating, classifying, categorizing, modifying, or any other type of document review and analysis technique. The user input may include but is not limited to any number of keystrokes, user selection, commands, mouse clicks, or button presses via the one or more computing devices.

At step 430, an initial control set of documents is generated based on the subset of the plurality of documents and the received user input on the subset. According to various embodiments, instructions stored in memory are executed, wherein execution of the instructions by a processor generates the initial control set based on the subset of the plurality of documents and the received user input on the subset from step 420. Step 430 of generating an initial control set may be accomplished by an initial control set generation module (such as the initial control set generation module 310 of FIG. 3) of the predictive coding application 135 (FIGS. 1 and 3).

At step 440, the initial control set is analyzed to determine at least one seed set parameter associated with the identified subject or category. A seed set parameter associated with the identified subject or category may be any type of criterion. A non-exhaustive list of seed set parameters includes relevancy, non-relevancy, attorney-client privilege, attorney work product, non-privileged and any issue or topic of interest. According to various embodiments, instructions stored in memory are executed, wherein execution of the instructions by a processor analyzes the initial control set (generated from step 430) to determine at least one seed set parameter associated with the identified subject or category. Step 440 of analyzing the initial control set may be accomplished by a targeted identification module (such as the targeted document identification module 320 of FIG. 3) of the predictive coding application 135 (FIGS. 1 and 3).

At step 450, a first portion of the plurality of documents is automatically coded, based on the initial control set and the at least one seed set parameter associated with the identified subject or category. According to various embodiments, instructions stored in memory are executed, wherein execution of the instructions by a processor automatically codes the first portion of the plurality of documents based on the initial control set (generated in step 430) and the at least one seed set parameter (as determined from step 440) that is associated with the identified subject or category. Step 450 of automatically coding the first portion of the plurality of documents may be accomplished by an analysis and coding module (such as the analysis and coding module 330 of FIG. 3) of the predictive coding application 135 (FIGS. 1 and 3).

At step 460, the first portion of the plurality of documents is analyzed by applying an adaptive identification cycle, the adaptive identification cycle being based on the initial control set, confidence threshold validation and user validation of the automated coding of the first portion of the plurality of documents. The adaptive identification cycle is based on the initial control set because the technology trains on the initial control set so that the technology may learn and suggest more likely responsive documents. The adaptive identification cycle is also based on the user validation of the automated coding of the first portion of the plurality of documents because the technology "learns" and the knowledge base of the technology improves when the automated coding is reviewed or otherwise verified by a human user. If a human user disagrees with the machine's automated coding and corrects the coding by hard coding the document (entirely or partially), the technology heuristically "learns" how to more appropriately code further documents in an automated fashion. The adaptive identification cycle allows for a user to request the technology to search for more responsive documents from the plurality of documents until the user receives results that are of limited utility. In other words, the corpus is searched entirely for responsive documents until the technology provides a result that has limited utility (such as the case where very few or no documents are found) and passes the confidence threshold validation.

According to various embodiments, instructions stored in memory are executed, wherein execution of the instructions by a processor analyzes the first portion of the plurality of documents by applying an adaptive identification cycle, the adaptive identification cycle being based on the initial control seed set (generated in step 430) and user validation of the automated coding (performed in step 450) of the first portion of the plurality of documents. Step 460 of analyzing the first portion of the plurality of documents may be accomplished by an adaptive identification cycle module (such as the adaptive identification cycle module 350 of FIG. 3) of the predictive coding application 135 (FIGS. 1 and 3).

At step 470, a second portion of the plurality of documents is retrieved based on a result of the application of the adaptive identification cycle on the first portion of the plurality of documents. According to various embodiments, instructions stored in memory are executed, wherein execution of the instructions by a processor retrieves a second portion of the plurality of documents is retrieved based on a result of the application of the adaptive identification cycle on the first portion of the plurality of documents (from step 460). Step 470 of retrieving the second portion of the plurality of documents may be accomplished by a document retrieval module (such as the document retrieval module 360 of FIG. 3) of the predictive coding application 135 (FIGS. 1 and 3).

According to various embodiments of the present technology, the method 400 includes further optional steps (not shown). Further optional steps include executing instructions stored in memory, wherein execution of the instructions by the processor adds further documents to the plurality of documents on a rolling load basis, and conducts a random sampling of initial control set documents both on a static basis and the rolling load basis. The optional step of adding further documents may be accomplished by a document retrieval module (such as the document retrieval module 360 of FIG. 3) of the predictive coding application 135 (FIGS. 1 and 3). The optional step of conducting a random sampling may be accomplished by a random sampling module (such as the random sampling module 340 of FIG. 3) of the predictive coding application 135 (FIGS. 1 and 3).

Yet further optional steps (not shown) include receiving user input via the computing device, the user input comprising inspection, analysis and hard coding of the randomly sampled initial control set documents and executing instructions stored in memory, wherein execution of the instructions by the processor automatically codes documents based on the received user input regarding the randomly sampled initial control set documents. The optional step of receiving user input may be accomplished using the interface module 137 of FIG. 1. The optional step of automatically coding documents based on the received user input may be accomplished an analysis and coding module (such as the analysis and coding module 330 of FIG. 3) of the predictive coding application 135 (FIGS. 1 and 3).

A further optional step (not shown) of the method 400 includes receiving user input from the computing device, the user input comprising a designation corresponding to key documents of the initial control set. The determination of whether a document is a key document may be based on the document's relevancy to an identified subject or category. A key document may be a critical, highly relevant document. A user typically makes a key document designation using the targeted document identification module 320 of FIG. 3 through some type of input, designation or selection of a key document of a coded seed set, although in some embodiments, a custodian of documents (the holder of documents) may have input on designating key documents. Key documents may also be identified for the seed set using data mining technology (e.g., searches, concepts, phrase extraction and filters). The optional step of receiving user input may be accomplished using the interface module 137 of FIG. 1.

Yet further optional steps of the method 400 include executing instructions stored in memory, wherein execution of the instructions by the processor: automatically codes the second portion of the plurality of documents resulting from an application of user analysis and the adaptive identification cycle, and adds the coded second portion of the plurality of documents to the initial control set.

The optional step of automatically coding the second portion of the plurality of documents may be accomplished by an analysis and coding module (such as the analysis and coding module 330 of FIG. 3) of the predictive coding application 135 (FIGS. 1 and 3), whereas the optional step of adding the second portion of the plurality of documents to the initial control set may be accomplished a document retrieval module (such as the document retrieval module 360 of FIG. 3) of the predictive coding application 135 (FIGS. 1 and 3).

A further optional step (not shown) of the method 400 includes transmitting to a display of the computing device the first portion of the plurality of documents. The computing device may be one or more networked-enabled computing devices (such as clients 110-118 in FIG. 1).

Yet further optional steps (not shown) of the method 400 include determining statistics related to any step or any result of the method 400. For instance, optional steps related to statistics include receiving user input via the computing device, the user input corresponding to a confidence level; and executing instructions stored in memory, wherein execution of the instructions by the processor: calculates a statistic regarding machine-only accuracy rate, and compares a statistic regarding machine coding accuracy rate against user input based on a defined confidence interval. The optional step of receiving user input may be accomplished using the interface module 137 of FIG. 1. The confidence level may be provided to a random sampling module (such as the random sampling module 340 of FIG. 3) of the predictive coding application 135 (FIGS. 1 and 3). The confidence level may help to identify the appropriate batch size of documents.

It may be noteworthy to understand the difference between the phrases "confidence threshold validation" (CTV) and "confidence interval" as used throughout. CTV is a sub-process within the predictive coding process which is used to test whether the accuracy of the machine-assisted review is greater than the human-only review. The CTV process may take the initial control set that was generated earlier in the process, supplement the initial control set through the process with further coded documents, and apply a statistical calculation to make the determination of whether the accuracy of the machine-assisted review is superior to the human-only review of the initial control set.

Part of the statistical calculation includes a confidence interval (CI), which is a particular kind of interval estimate of a population parameter. Instead of estimating the parameter by a single value, an interval likely to include the parameter is given. Thus, confidence intervals are used to indicate the reliability of an estimate. How likely the interval is to contain the parameter is determined by the confidence level or confidence coefficient. The confidence interval may be qualified by a particular confidence level, usually expressed as a percentage. Thus, one of the outputs of the CTV will be a "xx % confidence interval." Typically, a 95% or 99% confidence interval may be provided, depending on what is called for in the particular review. However, one skilled in the art will recognize that any numerical value may be provided in a confidence interval.

The optional steps of calculating a statistic regarding machine-only accuracy rate and comparing a statistic regarding machine coding accuracy rate against user input based on a defined confidence interval may be accomplished a statistical and comparative module (such as the statistical and comparative module 370 of FIG. 3) of the predictive coding application 135 (FIGS. 1 and 3). An accuracy rate is derived from documents that were returned as a result of "human-only assisted" review; in other words, a machine-assisted accuracy rate is based on documents that are determined as relevant by the machine (the computer) based on algorithms and human input. In contrast to a human-only accuracy rate, a human-only coding accuracy rate may be derived from documents that were returned based on human-only review.

A further optional step (not shown) of method 400 includes the execution of the instructions stored in memory, wherein the execution of the instructions by the processor automatically codes based on probabilistic latent semantic analysis (PLSA) and support vector machine analysis of the first portion of the plurality of documents. The PLSA may perform document categorization by automatically detecting concepts within documents via a statistical analysis of word contexts. Such word contexts may reflect the variety of concepts contained within a corpus of documents. Through PLSA, systems may be equipped to group documents together based on their similar concepts.

Support vector machine analysis may be conducted with the help of support vector machines (SVM), which are best suited for filters. A SVM may take a set of positive and negative examples of a single category for training, map those examples into an internal high-dimensional representation, and then compute linear functions on this internal representation to model training examples. Through support vector machine analysis, new documents or newly added documents may be categorized or otherwise coded as belonging or not belonging to a category of interest. The optional step of automatically coding the first portion of the plurality of documents based on probabilistic latent semantic analysis (PLSA) and support vector machine analysis may be accomplished by an analysis and coding module (such as the analysis and coding module 330 of FIG. 3) of the predictive coding application 135 (FIGS. 1 and 3).

Figure 5:
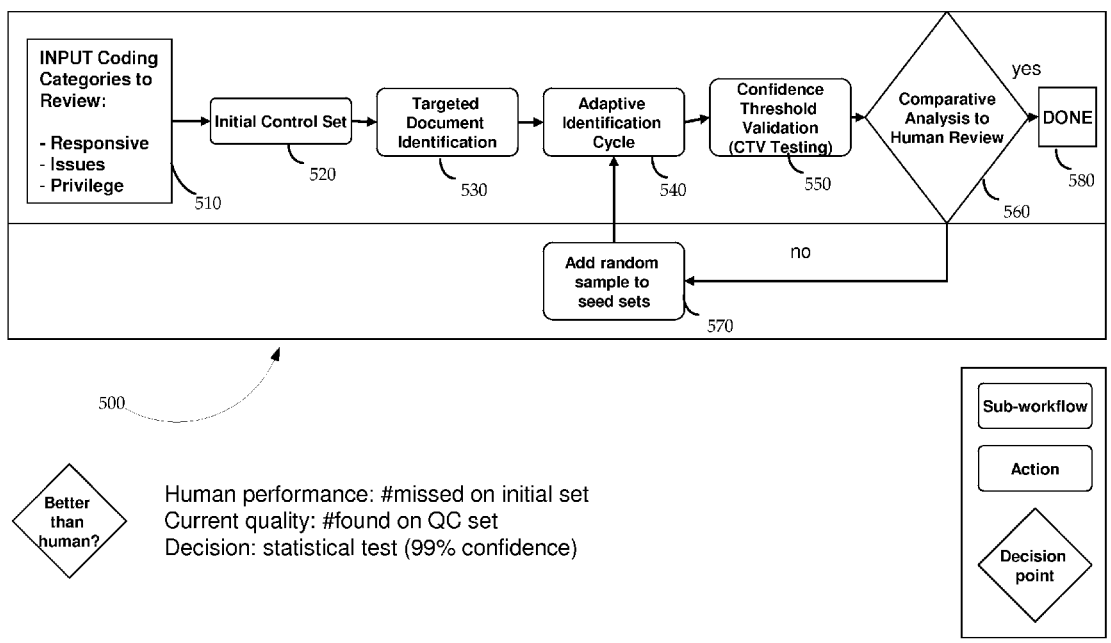
FIG. 5 is a flow diagram of a further exemplary method for analyzing documents in accordance with various embodiments of the present invention.

FIG. 5 is a flow diagram of an exemplary method 500 for analyzing documents. The exemplary method 500 may include predictive coding or tagging. At step 510, a coding category may be inputted. In some embodiments, the coding category is inputted by user input via a computing device. The user input may be received via an input device coupled to the one or more computing devices. The user input may include hard coding of a subset of the plurality of documents. The hard coding may be based on an identified subject or category. The hard coding may include a "human-only review" of the subset of the plurality of documents. The term "hard coding" may refer to any manual coding, tagging, notating, classifying, categorizing, modifying, or any other type of document review and analysis technique. The user input may include but is not limited to any number of keystrokes, user selection, commands, mouse clicks, or button presses via the one or more computing devices.

According to various embodiments, one of three coding categories (namely, "responsive," "issues" and "privilege") as used in litigation or discovery phase may be supplied or otherwise selected in step 510. The "responsive" category may be a category for documents that are deemed responsive to a given discovery request or topic. The "issues" category may be a category for documents that are deemed relevant to one or more issue(s). The issue(s) may be predefined, preselected or may be defined by the user at any time. The "privilege" category may be a category for documents that are deemed privileged by virtue of the attorney-client privilege, the attorney-work product, or any other privilege identified by prevailing law. It will be appreciated by one skilled in the art that for step 510, any type of coding category may be utilized and further that a coding category may be established by default, such that the coding category may not have to be selected or inputted in every iteration of the method 500.

At step 520, an initial control set is generated. According to some embodiments, similar to the step 430 of the method 400 (FIG. 4), at step 520, an initial control set may be generated based on a subset of the plurality of documents and the received user input on the subset. According to various embodiments, instructions stored in memory are executed, wherein execution of the instructions by a processor generates the initial control set based on the subset of the plurality of documents and the received user input on the subset. Step 520 of generating an initial control set may be accomplished by an initial control set generation module (such as the initial control set generation module 310 of FIG. 3) of the predictive coding application 135 (FIGS. 1 and 3). According to various embodiments, an exemplary method for generating an initial control set is provided in FIG. 6, which will be discussed later herein.

At step 530, targeted document identification may be conducted. In some embodiments, at step 530, documents for a given coding category are found. According to various embodiments, instructions stored in memory are executed, wherein execution of the instructions by a processor identifies targeted documents. Step 530 of identifying targeted documents may be accomplished by a targeted document identification module (such as the targeted document identification module 320 of FIG. 3) of the predictive coding application 135 (FIGS. 1 and 3). The targeted document identification may be configured for analyzing documents and may not be restricted to merely one type of analysis. In some exemplary instances, the targeted document identification may include an analysis of the initial control set to determine at least one set parameter associated with the identified subject or category. One skilled in the art will appreciate that the targeted document identification may not be confined merely to the initial control set. The targeted document identification may review, analyze or otherwise make determinations based on any number of documents, which may or may not be a part of the initial control set. Furthermore, according to various embodiments, an exemplary method for identifying targeted documents is provided in FIG. 7, which will be discussed later herein.

At step 540, an adaptive identification cycle may occur. According to some embodiments, similar to the step 460 of the method 400 (FIG. 4), at step 540, the adaptive identification cycle may be based on one or more of the initial control set, and user validation of the automated coding of a portion of the plurality of documents. The adaptive identification cycle may be based on the initial control set because the technology trains on the initial control set so that the technology may learn and suggest more likely responsive documents. The adaptive identification cycle may be based on the user validation of the automated coding of the first portion of the plurality of documents because the technology "learns" and the knowledge base of the technology improves when the automated coding is reviewed or otherwise verified by a human user. If a human user disagrees with the machine's automated coding and corrects the coding by hard coding the document (entirely or partially), the technology heuristically "learns" how to more appropriately code further documents in an automated fashion. The adaptive identification cycle allows for a user to request the technology to search for more responsive documents from the plurality of documents until the user receives results that are of limited utility. In other words, the corpus is searched entirely for responsive documents until the technology provides a result that has limited utility (such as the case where very few or no documents are found) and passes the confidence threshold validation.

According to various embodiments, instructions stored in memory are executed, wherein execution of the instructions by a processor conducts an adaptive identification cycle. Step 540 of performing an adaptive identification cycle may be accomplished by an adaptive identification cycle module (such as the adaptive identification cycle module 350 of FIG. 3) of the predictive coding application 135 (FIGS. 1 and 3). According to various embodiments, an exemplary method for an adaptive identification cycle is provided in FIG. 8, which will be discussed later herein.

At step 550, confidence threshold validation or CTV testing may occur. In some embodiments, confidence threshold validation (CTV) is a sub-process within the predictive coding process used to test whether the accuracy of the machine-assisted review is greater than the human-only review. The CTV process may take the initial control set that was generated earlier in the process, (which in some cases may be supplemented through the process with further coded documents) and apply a statistical calculation to make the determination of whether the accuracy of the machine-assisted review is superior to the human-only review of the initial control set. According to various embodiments, an exemplary method for confidence threshold validation or CTV testing is provided in FIG. 9, which will be discussed later herein.

As a user tests, a user may change the population size, sample size, errors found in the human review or machine-assisted review and other metrics to determine human versus machine-assisted review results.

At step 560, a comparative analysis to human review may take place. According to various embodiments, the comparative analysis determines whether the current quality of the documents coded or otherwise tagged by this predictive coding process technology is better than that of human-only review (manual review of documents). According to various embodiments of the present technology, the initial control set has at least two functions; namely, (i) to calculate the accuracy of the human-only review and (ii) to serve as a seed set of documents for the machine learning technology to find contextually similar documents which are used to supplement the initial control set as the adaptive identification cycle occurs. In some embodiments, human performance (as provided by human-only review documents) may be measured for accuracy against machine learning technology (as provided by machine-coded documents included in the initial control set. In various embodiments, a statistic regarding machine-only accuracy rate of the documents may be calculated. In further embodiments, a statistic regarding machine coding accuracy rate may be compared against user input based on a defined confidence interval. Step 560 of conducting a comparative analysis may be accomplished by a statistical and comparative module (such as the statistical and comparative module 370 of FIG. 3) of the predictive coding application 135 (FIGS. 1 and 3). In some embodiments, a statistical calculation is accomplished by a statistical and comparative module (such as the statistical and comparative module 370 of FIG. 3) of the predictive coding application 135 (FIGS. 1 and 3).

If it is determined at step 560 that the quality of the documents coded by the technology is not better than human performance, then the method 500 continues to step 570 where a random sample is added to the initial control seed set. In other words, if the human-only review is superior to the machine-assisted review in terms of accuracy, then the machine learning needs better feedback through the adaptive identification cycle, where re-training of the algorithm occurs.

According to some embodiments, a random sample may be provided by a random sampling module (such as the random sampling module 340 of FIG. 3) of the predictive coding application 135 (FIGS. 1 and 3).

If, on the other hand, at step 560 it is determined that the quality of the documents coded by the technology is better than human performance, then the method 500 is done at step 580. In exemplary FIG. 5, since a 99% confidence is sought, a statistical test showing that the technology has a 99% confidence would indicate that the quality of the documents coded by the technology is better than human performance. It will be appreciated by those skilled in the art that the user may define the percentage of confidence for the statistical testing.

Figure 6:
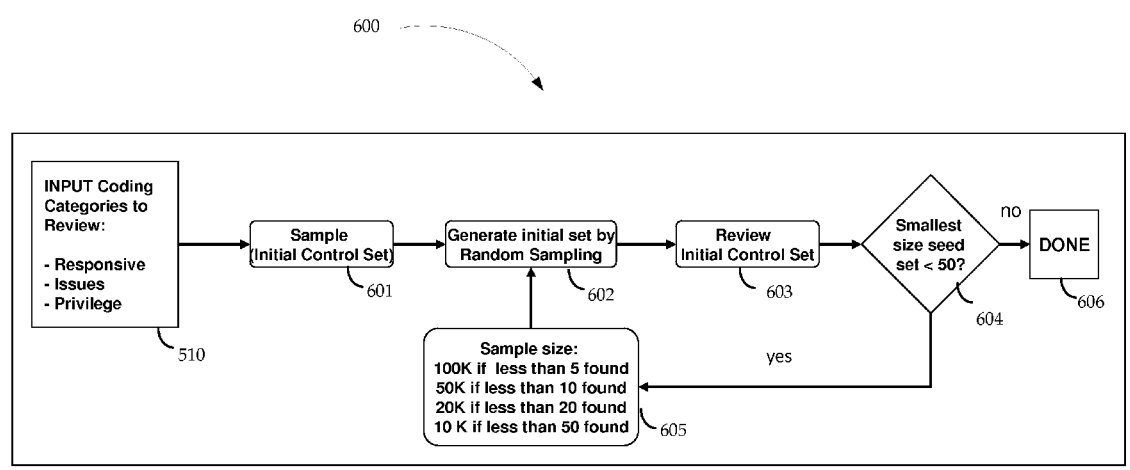
FIG. 6 is a flow diagram of an exemplary method for generating an initial control set in accordance with various embodiments of the present invention.

FIG. 6 depicts an exemplary method 600 for generating an initial control set. In some embodiments, FIG. 6 may depict further steps that are included in the step 520 of the method 500 (FIG. 5).

The method 600 begins with step 510, which was earlier described in relation with the method 500 of FIG. 5. At step 510, a coding category may be inputted. At step 601, the initial control set is sampled. At step 602, an initial control set is generated by random sampling. At step 603, the initial control set is reviewed.

At step 604, a determination is made whether the smallest sized seed set has less than 50 documents. If the smallest sized seed set has less than 50 documents, then the method 600 continues with step 605. At step 605, the sample size is determined.

According to exemplary embodiments, a sample size is set at 100,000 if less than 5 documents are found in the smallest sized seed set at step 604; a sample size is set at 50,000 if less than 10 documents are found in the smallest sized seed set at step 604; a sample size is set at 20,000 if less than 20 documents are found in the smallest sized seed set at step 604; or a sample size is set at 10,000 if less than 50 documents are found in the smallest sized seed set at step 604. After step 605, the method 600 routes back to step 602.

If, on the other hand, at step 604, it is determined that the smallest sized seed set does not have less than 50 documents, then the method 600 is done at step 606.

Figure 7:
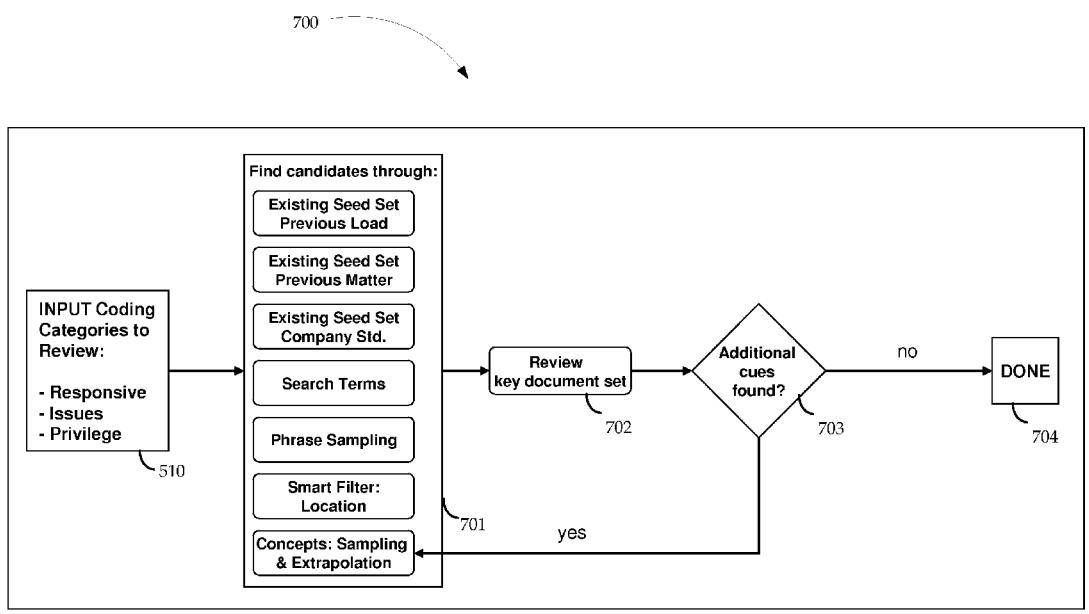
FIG. 7 is a flow diagram of an exemplary method for targeted document identification in accordance with various embodiments of the present invention.

FIG. 7 depicts an exemplary method 700 for conducting a targeted document identification. In some embodiments, FIG. 7 may depict further steps that are included in the step 530 of the method 500 (FIG. 5).

The method 700 begins with step 510, which was earlier described in relation with the method 500 of FIG. 5. At step 510, a coding category may be inputted. At step 701, candidates are found. Candidates may be found in any number of areas, including but not limited to, an existing seed set of previous load, an existing seed set of a previous matter, an existing seed set of a company standard, search terms, phrase sampling, smart filter: location, and concepts: sampling and extrapolation.

At step 702, a key document set is reviewed. According to various embodiments of the technology, a key document set may comprise documents that have been confirmed by human review and coding to be likely responsive to a coding category. Key documents are initially identified by (i) filters that cull data according to various metadata parameters and (ii) human review since humans typically know something about the case.

At step 703, a determination is made whether additional cues are found. If additional cues are found at step 703, then the method 700 continues with step 701. If, on the other hand, at step 703, it is determined no additional cues are found, then the method 700 is done at step 704.

Figure 8:
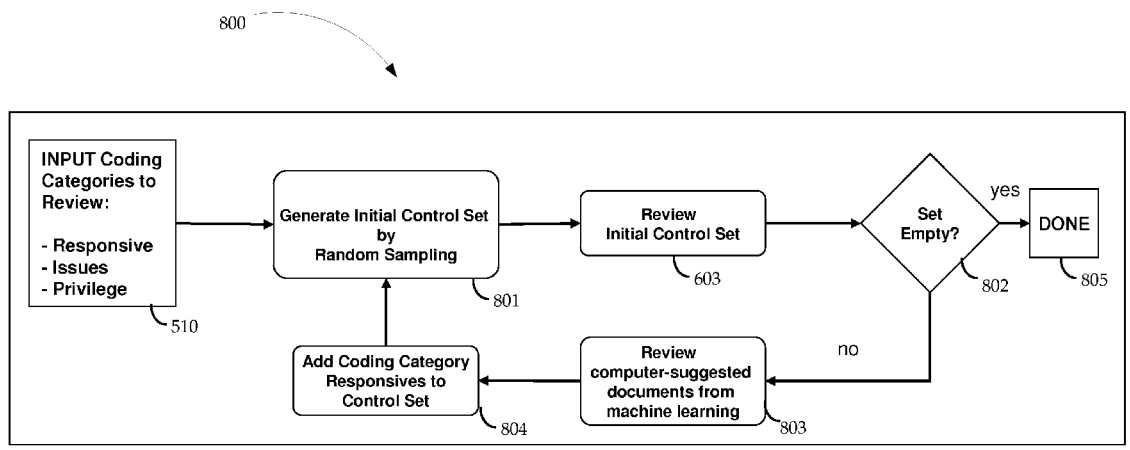
FIG. 8 is a flow diagram of an exemplary method for an adaptive identification cycle in accordance with various embodiments of the present invention.

FIG. 8 depicts an exemplary method 800 for performing an adaptive identification cycle (AIC). In some embodiments, FIG. 8 may depict further steps that are included in the step 540 of the method 500 (FIG. 5).

The method 800 begins with step 510, which was earlier described in relation with the method 500 of FIG. 5. At step 510, a coding category may be inputted. At step 801, the initial control set is generated, modifying or otherwise provided by random sampling. At step 603, the initial control set is reviewed, which was earlier described with regards to step 603 shown in FIG. 6.

At step 802, a determination is made whether the initial control set includes documents that are likely responsive to a coding category. If the initial control set is "empty" or has no documents that are likely responsive to a coding category, then the method 800 continues with step 803. At step 803, computer-suggested documents from machine learning are reviewed. In some embodiments, the computer-suggested documents are reviewed manually by human users. The method 800 continues with step 804, where coding category responsives are added to the initial control set. In other words, documents that are responsive or belong to a given coding category are added to the initial control set. The method 800 further continues with a revisit to step 801.

If, on the other hand, at step 802, it is determined that the initial control set is not empty (that is, the initial control set includes documents that are likely responsive to a coding category), then the method 800 is done at step 805.

Figure 9:
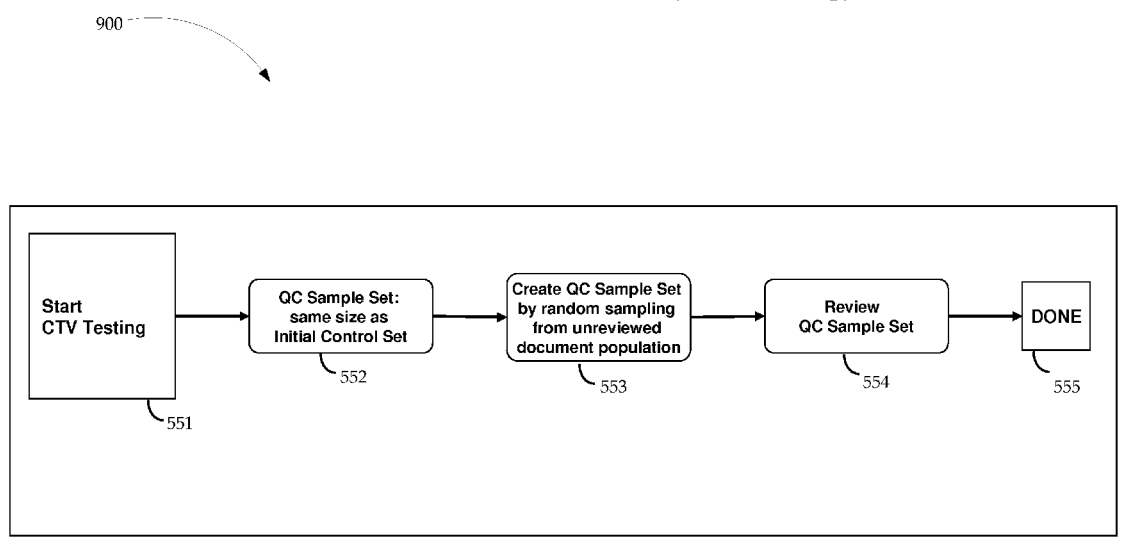
FIG. 9 is a flow diagram of an exemplary method for confidence threshold validation in accordance with various embodiments of the present invention.

FIG. 9 depicts an exemplary method 900 for conducting a confidence threshold validation (CTV testing). In some embodiments, FIG. 9 may depict further steps that are included in the step 550 of the method 500 (FIG. 5).

At step 901, confidence threshold validation (CTV testing) begins. At step 902, the size of a quality control (QC) sample set is set as having the same size as that of the initial control set. At step 903, the QC sample set is created by random sampling from unreviewed document population. At step 904, the QC sample set is reviewed. At step 905, the method 900 is done.

Figure 10:
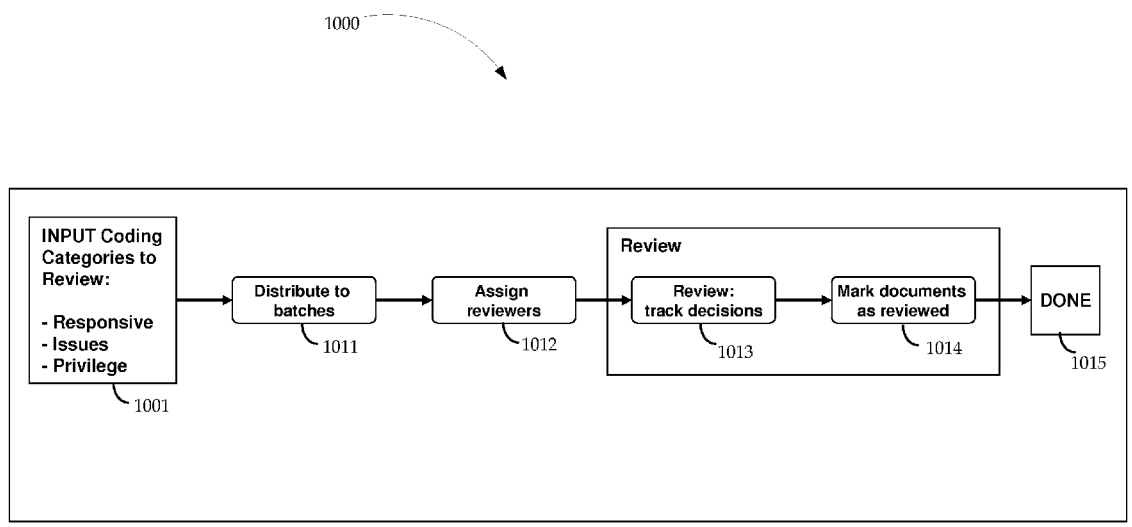
FIG. 10 is a flow diagram of an exemplary method for reviewing an initial control set in accordance with various embodiments of the present invention.

FIG. 10 depicts an exemplary method 1000 for reviewing an initial control set. In some embodiments, FIG. 10 may depict further steps that are included in the step 603 (FIGS. 6 and 8).

The method 1000 begins with step 510, which was earlier described in relation with the method 500 of FIG. 5. At step 510, a coding category may be inputted. At step 1001, documents are distributed to batches. At step 1002, reviewers are assigned. At steps 1003 and 1004, the review takes place. At step 1003, track decisions are reviewed. At step 1004, documents are marked as reviewed. At step 1005, the method 1000 is done.

One skilled in the art will recognize that the scope of the present technology allows for any order or sequence of the steps of any of the methods mentioned herein to be performed. Also, it will be appreciated by one skilled in the art that the steps in one or more methods described herein may be removed altogether or replaced with other steps (such as the optional steps described herein) and still be within the scope of the invention. Any of the steps of the methods described herein may be combined, added or modified for any other methods described herein, and still be within the scope of the invention. Furthermore, those skilled in the art will understand that any of the elements of the systems described herein (including but not limited to the systems depicted in FIGS. 1-3) may be combined, added, or modified to fit any other systems described herein, and still be within the scope of the invention.

Some of the above-described functions may be composed of instructions that are stored on storage media (e.g., computer-readable medium). The instructions may be retrieved and executed by the processor (such as the processor 210 in FIG. 2). Some examples of storage media are memory devices, tapes, disks, and the like. The instructions are operational when executed by the processor 210 to direct the processor 210 to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for analyzing a plurality of documents, comprising:

receiving the plurality of documents via a computing device;

receiving user input from the computing device, the user input including hard coding of a subset of the plurality of documents, the hard coding based on an identified subject or category;

executing instructions stored in memory, wherein execution of the instructions by a processor:

generates an initial control set based on the subset of the plurality of documents and the received user input on the subset, analyzes the initial control set to determine at least one seed set parameter associated with the identified subject or category, automatically codes a first portion of the plurality of documents, based on the initial control set and the at least one seed set parameter associated with the identified subject or category, analyzes the first portion of the plurality of documents by applying an adaptive identification cycle, the adaptive identification cycle being based on the initial control set, user validation of the automated coding of the first portion of the plurality of documents and confidence threshold validation, retrieves a second portion of the plurality of documents based on a result of the application of the adaptive identification cycle on the first portion of the plurality of documents;

adds further documents to the plurality of documents on a rolling load basis, and conducts a random sampling of initial control set documents both on a static basis and the rolling load basis;

receiving user input via the computing device, the user input comprising inspection, analysis and hard coding of the randomly sampled initial control set documents; and executing instructions stored in memory, wherein execution of the instructions by the processor automatically codes documents based on the received user input regarding the randomly sampled initial control set documents.

2. The method of claim 1, further comprising receiving user input from the computing device, the user input comprising a designation corresponding to key documents of the initial control set.

3. The method of claim 1, further comprising:
executing instructions stored in memory, wherein execution of the instructions by the processor:
automatically codes the second portion of the plurality of documents resulting from an application of user analysis and the adaptive identification cycle, and
adds the coded second portion of the plurality of documents to the initial control set.

4. The method of claim 1, further comprising transmitting to a display the first portion of the plurality of documents, the display coupled to the computing device.

5. The method of claim 1, further comprising:
receiving user input via the computing device, the user input corresponding to a confidence level; and
executing instructions stored in memory, wherein execution of the instructions by the processor:
calculates a statistic regarding machine-only accuracy rate, and
compares a statistic regarding machine coding accuracy rate against user input based on a defined confidence interval.

6. The method of claim 1, wherein the step of automatically coding a first portion of the plurality of documents further comprises executing instructions stored in memory, wherein execution of the instructions by the processor automatically codes based on probabilistic latent semantic analysis and support vector machine analysis of the first portion of the plurality of documents.

* * * * *